Patented Oct. 10, 1939

2,176,034

UNITED STATES PATENT OFFICE 2,176,034

ANTIOXYGENIC SUGAR PREPARATION AND METHOD OF MAKING AND USING SAME

Sidney Musher, New York, N. Y., assignor to Musher Foundation Incorporated, New York, N. Y., a corporation of New York No Drawing. Application November 21, 1938, Serial No. 241,641

12 Claims. (Cl. 99—150)

The present invention relates to the preparation of a new sugar and sugars which possess marked stabilizing and antioxygenic properties.

It is the purpose of the present invention to provide new modified sugars possessing marked stabilizing and antioxygenic properties which may be widely used to overcome oxidative deterioration of organic materials.

A further object is the retardation of oxidative deterioration by simple and economical means through the use of these modified sugars either as additive products or in partial or complete replacement for ordinary sugars normally used.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is preferably used the substantially crude unrefined or raw sugar as obtained from the cane and beet, and desirably in crystallized form, or in form capable of crystallization.

Where the stabilizing sugar is to be used for food products, the crude or raw sugar should desirably be washed and filtered by adding water thereto and subjected to a filtration process to remove dirt and other extraneous and objectionable matter.

Crystallized and uncrystallized residues from the washings including the mother liquors may also be used, although it is generally desirable to utilize the crystallized washed material as against the residues. The sugars that are preferred are those which have not been subjected to any bone char treatment as would tend to bleach or whiten the sugar, but they should preferably be in their crude and unrefined condition except insofar as the removal of dirt, bacteria and other objectionable matter is concerned.

In accomplishing the above objects, the sugars are prepared with a minor amount of the water soluble and less preferably the alcohol soluble extract of cereals and grains, which include corn, barley, oats, hominy, tapioca, rye, rice, wheat, buckwheat, etc.

The preferred cereals are those which contain less than 0.75% total phospholipins and less than 10% of glyceride content and they are preferably in a fine state of division. The oat and maize cereals, preferably in raw and unbleached condition, and dry milled and finely divided, give the highest yield of stabilizing activity as against the other cereals when utilized with the sugars.

In accordance with this invention, a water soluble extract of the cereal is taken and that water soluble extract is combined with the sugar. For the preparation of the water soluble extract, the cereal may be submerged in water and the undissolved starchy and fibrous residual portions removed by filtration, decanting, centrifuging or similar process, the time of extraction varying from a few seconds to a period of several hours or longer. The aqueous solvent may be employed at higher than room temperature in order to more thoroughly dissolve out the water soluble fraction. For example, to 1 pound of cereal there may be used 1 gallon or more of water, dependent upon the degree of concentration desired.

Once the undissolved cereal fibers have been removed, the water in the extract is desirably evaporated off as by vacuum distillation or ordinary evaporation to a point where more than 15% of solids and desirably about 35% of solids of the water extract are present in the solution.

This extract in concentrated form such as, for example, the concentrated water extract of pulverized oats may be added to clarified crude cane sugar after the sugar has been crystallized out, but before it has been subjected to its final drying operation. The aqueous extract should then be thoroughly admixed in the sugar, preferably subjecting the sugar to a milling, rolling or pressing operation in order to obtain a thorough admixture of the two products.

The water extract may be subjected to a complete drying operation before mixture with the crystallized sugar, or the water extract may be added to the sugar syrups, either resulting as a by-product from the crystallization of the crude clarified sugar, or added to the sugar prior to the crystallization process. It is desirable, however, where the crystallized sugar is to be prepared, to add the extract direct to the crystallized sugar, rather than to add it to the liquor or syrup prior to crystallization.

Were the sugar liquor or syrup is to be treated, that syrup may be used for the extracting medium so that, for example, 1 pound of maize flour may be admixed with 1 gallon of water containing 5% of dissolved raw sugar. The maize flour solids may then be allowed to settle out and the water syrup extract removed. Or the water extract of the cereal may be added to a sugar syrup or crystallized sugar may be dissolved therein and recrystallized subsequently therefrom.

The amount of sugar and cereal extract to be used will vary within fairly wide limits, such as, for example, from about 0.02% of the cereal extract and 99.98% of the sugar on their solids weight basis, to about 50% of the cereal extract and 50% of sugar. The amount of cereal extract and sugar to be used will depend largely upon the degree of stabilizing activity desired and also upon whether or not a uniform crystalline structure is desired in the preparation of the sugar and dependent upon the use to which the sugar is going to be put.

A minor amount of the cereal extract is preferred against the weight of the sugar and preferably less than 5% of the cereal extract is used with 95% of the sugar, on their solids weight basis. For example, it has been found that less than 5% of the cereal extract and 95% of sugar will give a satisfactory crystalline product which can be readily applied to many organic products that are subject to oxidative deterioration.

On the other hand, satisfactory complexes are prepared using, for example, 60% of sugar with 40% of the cereal extract and although this product does not possess the same crystalline structure as the aforementioned product, nevertheless it possesses marked stabilizing and antioxygenic properties when used with organic materials.

Sugar as prepared in this manner and particularly when utilizing the substantially crude unrefined sugars referred to, will be markedly antioxygenic in character as compared with ordinary sugar or even as compared with the cereal extracts themselves. Ordinary refined sugars, insofar as most organic products are concerned, possess no antioxygenic properties. The crude unrefined sugars do possess antioxygenic properties, but when utilizing the cereal extract-sugar combination or complexes there is obtained a marked enhancement in stabilizing activity which cannot be expected from the stabilizing activity of any of the individual component parts of these complexes, such as, for example, might be assumed from the stabilizing activity of the carbohydrates contained in the sugars or in the water extract, or from any of the other individual fractions in the resulting complex.

It is not known whether an actual chemical combination takes place or whether it is merely an adsorptive phenomenon which occurs at the surface of the sugar crystals or in the sugar molecule or whether there is an interaction of a catalytic nature and which results in marked enhancement of stabilizing and antioxygenic activity.

*Example I*

Cream containing 35% butterfat was contaminated with two parts per million of CuSo4. The creams were prepared as follows:

*Cream A.*—Treated with 0.5% of crude clarified cane sugar.

*Cream B.*—Treated with 0.5% of a modified sugar prepared by mixing thoroughly and grinding together 90% of clarified raw cane sugar and 10% of the concentrated water extract of oat flour, free of oat fibers and water insoluble material.

The creams were observed at regular intervals after placing at 50° F., the number of plus signs indicating the degree of oxidized flavor developing after storage.

| | Observations after— | | |
|---|---|---|---|
| | 24 hours | 48 hours | 72 hours |
| Cream A | + | +++ | ++++ (inedible) |
| Cream B | − | ± | + |

The new modified sugars are particularly important when utilized in connection with aqueous materials that are subject to oxidative deterioration, such as organic materials including fruit juices, beverages, jams and jellies, carbonated drinks, dairy products, pickle baths for curing of meats, fish, vegetables, fruit, etc., and for similar purposes.

*Example II*

A fruit flavored sugar was prepared using oil of lemon as the base together with 1.0% of gelatin and the aqueous gelatin product was used as a dessert. The oil of lemon and sugar mixture was first prepared as follows:

A. Using 3% of oil of lemon and 97% of crude beet sugar.

B. Using 3% of oil of lemon and 97% of a mixture of sugars made of a combination using 70% crude beet sugar and 30% of a modified crude beet sugar made by spraying the concentrated water extract of maize flour having a solids content of 45% onto crude beet sugar so that the finished modified beet sugar contained 80% of beet sugar and 20% of the maize extract free of undissolved maize fibers.

The gelatin was then mixed with these products and they were set aside at room temperature in open containers. They were examined at intervals after preparation as aqueous jellies, the observations being based upon a perfect score of 100.

| | Observations after— | | |
|---|---|---|---|
| | 15 days | 30 days | 45 days |
| Dessert A | 80 | 70 | 55 |
| Dessert B | 90 | 85 | 70 |

The modified sugars may be employed in any desired percentage, but generally they are used in amounts that vary from 0.1% to 10.0%. A great deal will depend upon the concentration of sweetness desired in the finished product in the event that it is an edible product, or the degree of protection that is desired in the event that it is an inedible product. Of course, in the case of special products such as in the case of dessert powders, the amount of sugar to be used will be far in excess of 10%.

In the preparation of the water or other soluble extracts of the cereals, the solvent employed may be either water or it may be an aqueous material which may be the organic material to be stabilized. Then sugar preferably in crude condition may be added to such extract.

In addition to the use of the water soluble extract of the cereal, the alcohol soluble extract may also be employed, including particularly the extract obtained using low molecular weight aliphatic alcohols, such as methyl, ethyl, etc. Where the modified sugar is to be incorporated with aqueous materials, the water soluble extract is preferred.

These modified sugars show particularly marked antioxygenic and stabilizing activity when subjected to elevated temperatures in the presence of the oxidizable material. For example, where the modified sugar is heated to in excess of 145° F. and preferably about 250° F. in the presence of the material subject to oxidation, a marked enhancement in antioxidant and stabilizing activity is obtained. A heat treatment of as high as 400° F. to 500° F. will give still further stabilizing action or as little as 145° F. will materially improve the antioxidant activity of the modified sugar. It is not definitely known why the marked enhancement in stabilizing activity is obtained when the sugar complexes or modified sugars are heated in the presence of the oxidizable material but it is believed that some chemical action occurs when using the sugar-cereal extract combination.

*Example III*

Ice cream mix was prepared from cream known to be susceptible to the development of oxidized flavors using the following sugars:

Ice cream mix A.—5% refined cane sugar and 10% clarified crude cane sugar.

Ice cream mix B.—5% refined cane sugar and 10% of a modified sugar. This was prepared by thoroughly mixing 99.75% of crude clarified cane sugar and 0.25% of the water extract of oat flour. This water extract had first been brought to a solid concentration of 50%, then sprayed on the sugar crystals. The mixture was then dried.

The ice cream mixes thus prepared were pasteurized at 150 F. for 20 minutes, cooled, and then frozen. The ice cream mixes were flavored with strawberries and then observed for oxidized flavor development at stated intervals.

|  | Degree of oxidized flavor after— | | |
|---|---|---|---|
|  | 2 weeks | 4 weeks | 6 weeks |
| Ice cream mix A | + | ++ | +++ |
| Ice cream mix B | − | − | + |

Although it is particularly desirable to utilize the substantially crude unrefined sugars either in crystalline or uncrystallized form, and as obtained from the sugar cane and sugar beets, the refined sugars may also be utilized together with the water and alcohol soluble extracts of the cereals and grains in order to give marked antioxidant and stabilizing activity.

For example, the refined sugars would include those sugars which have been subjected to refining operations such as to bone char filtration, and including ordinary refined cane sugar, refined beet sugar, refined corn sugar or dextrose, etc. There would also be included the substantially purified sugars including pure sucrose, dextrose, fructose, galactose, invert sugar, maltose, lactose, mannose, arabinose, and less preferably other commonly available water soluble mono, di, and poly saccharides or carbohydrates. These would also include the various refined sugars, whether brown sugar or perfectly white.

These sugars also form combinations either of a semi-chemical, or adsorptive nature with the water soluble materials present in the cereal and by which marked antioxygenic character is given to those sugars.

*Example IV*

Mayonnaise containing 78% of cottonseed oil was prepared using 4.0% of the following sugar:
A. Refined cane sugar
B. A new sugar composition made by thoroughly admixing 0.5% of the concentrated water soluble extract of oat flour with the refined cane sugar, so that a composite crystalline sugar was obtained.

The mayonnaise samples were held in glass enclosed containers at room temperature and observations for rancidity noted at weekly intervals:

Mayonnaise A, slight rancidity at 3 weeks, definitely rancid at 5 weeks

Mayonnaise B, slightly rancid at 5 weeks, definitely rancid at 6 weeks.

In the same way that the substantially crude and unrefined sugars in combination with the water extracts of the cereals and grains become particularly effective and enhanced in antioxidant activity when subjected to elevated temperatures in the presence of the oxidizable materials, the refined sugars will exhibit similarly enhanced antioxidant action.

*Example V*

To cream containing 32% butterfat was added 3 p. p. m. of $CuSO_4$ and the following sugar:
A. 10% of dextrose (corn sugar)
B. 10% of a modified dextrose made by thoroughly admixing 1.0% of the water extract of maize flour in concentrated form with the dextrose.

The creams were heated to 180° F. for 5 minutes and then set aside at 10° F. for storage. Observations as to the development of oxidized flavor were made as indicated.

|  | Observations after— | | |
|---|---|---|---|
|  | 2 months | 3 months | 4 months |
| Cream A | + | +++ | ++++ (inedible) |
| Cream B | − | + | ++ |

*Example VI*

Orange juice was prepared with the following:
A. 3.0% of refined cane sugar.
B. 3.0% of refined cane sugar, modified by thoroughly admixing therewith 0.5% of the concentrated water extract of oat flour.

The orange juice samples were heated to 160° F. for 5 minutes and then cooled. They were set aside at 50° F. for observation, and scored at stated intervals, based upon a perfect scoring of 100.

|  | Scoring after— | | |
|---|---|---|---|
|  | 24 hours | 48 hours | 72 hours |
| Orange juice A | 90 | 80 | 65 |
| Orange juice B | 95 | 85 | 80 |

It may be seen from the above tests and experiments that the activity of the modified sugar as an antioxidant is far superior to the activity of any of the individual components of the materials that comprise the modified sugar.

Although the extract may be added in unconcentrated form to various materials to be stabilized, it is found that the same amount of extract gives much higher stabilizing action when added in concentrated form.

For example, the extract obtained by mixing 1 pound of oat flour with 1 gallon of water will show an increased antioxygenic activity of about 1½ to 3 times when concentrated to a solids content of 15% to 35% from a solids content of 1% to 2% which is its initial concentration.

For example, if the unconcentrated extract and the concentrated extract from the same amount of oat flour were added to a large quantity of cream, the cream containing the concentrated extract would be better stabilized than the cream containing the unconcentrated extract.

These modified sugars may be utilized in the stabilization of many kinds of organic materials, particularly aqueous, fat and essential oil-containing compositions, such as dairy products, including milk, cream, ice cream, condensed and evaporated milk, etc., confections including toffees, caramels, nougats, milk chocolate, lime, lemon or orange drops, butter creams, fruit juices, jams and jellies, marmalade, coffee, dessert powders, canned fruits, beverages such as orange drink, lemon drink, raspberry syrup, etc., and each and all of these products will be materially stabilized against oxidative deterioration.

Less preferably, the complexes of the present invention may be applied to the stabilization of non-aqueous materials such as the essential oils, glyceride oils and the hydrocarbon oils.

For example, 2% of a modified sugar composed of 80% of crude cane sugar and 20% of the ethyl alcohol extract of pulverized oatmeal may be added to cod liver oil and the cod liver oil may preferably be subjected to an elevated temperature treatment of about 300° F. to 400° F. for 0 to 5 minutes.

With white mineral oil, there may be used 0.5% of a modified sugar containing 75% of refined cane sugar and 25% of a concentrated water extract of pulverized whole oats. A heat treatment to 300° F. for 5 minutes may be utilized to obtain enhancement of the antioxygenic effect.

With the non-aqueous materials, it is usually found more desirable to utilize organic solvent extracts such as the alcohol extracts of the cereal or grain flours.

Although low molecular weight aliphatic alcohols and particularly ethyl alcohol are preferred, it is also possible to use glycols, glycerol, mannitol, sorbitol and other similar polyhydric materials.

The present application is a continuation in part of application, Serial No. 14,701 filed April 4, 1935.

Having described my invention what I claim is:

1. An antioxygenic sugar preparation consisting of a major proportion of a water soluble carbohydrate and a minor proportion of the concentrated substantially oil free, starch free and fibre free water soluble antioxygens extracted from the meal portion of finely divided unbleached cereal flours.

2. An antioxygenic crystallized sucrose preparation to be added in relatively small proportions to organic products susceptible to oxidative deterioration to stabilize them against such deterioration, said crystallized sucrose preparation containing a minor proportion of the water soluble cereal antioxygens extracted from finely divided unbleached cereal meals.

3. An antioxidant combination comprising a crystallized sugar carrying water soluble cereal antioxygens extracted from the meal portion of finely divided unbleached cereal flours, and substantially devoid of oil, starch and cereal fibres.

4. In intimate combination with an organic product susceptible to oxidative deterioration to retard such deterioration, a relatively small amount of an antioxygenic sugar preparation consisting of an intimate mixture of a crystallized sugar and the water soluble cereal antioxygens extracted from finely divided unbleached cereal meals.

5. A process of preparing an antioxidant mixture for addition in relatively small quantities to organic products susceptible to oxidative deterioration to retard such deterioration, said process comprising mixing a finely divided unbleached cereal meal containing less than 0.75% of total phospholipins and less than 10% glycerides in a relatively large volume of water, continuing the mixture of the water and the cereal meal until the water soluble antioxygens in said cereal meal have been substantially taken into solution, removing the undissolved starchy and fibrous cereal residues, concentrating the antioxygenic water solution and combining said antioxidants in concentrated form with a relatively large quantity of a sugar material.

6. A process of preparing an antioxidant mixture for addition in relatively small quantities to organic products susceptible to oxidative deterioration to retard such deterioration, said process comprising mixing a finely divided unbleached cereal meal containing less than 0.75% of total phospholipins and less than 10% glycerides in a relatively large volume of water, continuing the mixture of the water and the cereal meal until the water soluble antioxygens in said cereal meal have been substantially taken into solution, removing the undissolved starchy and fibrous cereal residues, concentrating the antioxygenic water solution and combining said antioxidants in concentrated form with a relatively large quantity of crystallized sucrose.

7. A process of making an antioxidant preparation for addition in relatively small quantities to organic materials subject to oxidative deterioration, to retard such deterioration, such process comprising mixing unbleached finely divided cereal flours with a relatively large volume of water, followed by removal of the cereal residues, concentrating the residue-free water solution that is thus obtained, mixing the contrated solution containing the antioxidants extracted from the unbleached cereal flour with sugar, and then removing the water to produce a dry antioxygenic sugar preparation.

8. A process of producing an antioxygenic sugar preparation for addition in relatively small quantities to organic products subject to oxidative deterioration to retard oxidative deterioration thereof, such process comprising mixing a relatively small amount of the finely divided unbleached cereal flour with a relatively large amount of an aqueous sugar solution, removing the cereal flour residues from the sugar solution, and then concentrating the sugar solution, whereby there is produced an antioxygenic sugar having high stabilizing value when added to said organic products.

9. An antioxygenic sugar preparation consisting substantially of about 99% of crystallized sucrose and about 1% of the water soluble antioxidants contained in unbleached cereal flours extracted from such cereal flours, said antioxidants containing water soluble antioxidants and being substantially devoid of fibre, starch and oil.

10. A stabilized organic material containing a highly active antioxygenic sugar preparation consisting substantially of a major proportion of a water soluble carbohydrate and a minor proportion of the water soluble antioxygens present in unbleached finely divided cereal flours, said antioxygens having been extracted from said cereal flours and being substantially devoid of insoluble cereal residues.

11. A process of stabilizing an organic material susceptible to oxidation which comprises forming a combination of a crystallized sugar and water soluble antioxygens present in unbleached cereal flours, said antioxygens being extracted from the cereal flours and being substantially devoid of oil, fibre and starch, and mixing the combination with the organic product susceptible to oxidation.

12. An antioxidant combination comprising a crystallized sugar carrying water soluble antioxygens extracted from unbleached maize and substantially devoid of oil, starch and cereal fibers.

SIDNEY MUSHER.